United States Patent [19]

Senshu

[11] Patent Number: 5,802,027
[45] Date of Patent: Sep. 1, 1998

[54] REPRODUCTION CLOCK PHASE CORRECTION CIRCUIT

[76] Inventor: Susumu Senshu, c/o Sony Corporation, 7-35, Kitashinagawa 6-chome, Shinagawa-ku, Tokyo, Japan

[21] Appl. No.: 759,488

[22] Filed: Dec. 5, 1996

[30] Foreign Application Priority Data

Dec. 11, 1995 [JP] Japan .................. 7-322014

[51] Int. Cl.$^6$ .................................................. G11B 5/09
[52] U.S. Cl. .................................................. 369/48; 369/57
[58] Field of Search .................................. 369/47, 48, 54, 369/32, 59, 60, 124; 300/51, 53, 54, 49

[56] References Cited

U.S. PATENT DOCUMENTS

| 5,172,357 | 12/1992 | Taguchi | 369/48 |
| 5,253,243 | 10/1993 | Suzuki | 369/48 |
| 5,440,532 | 8/1995 | Yokogawa et al. | 369/32 |
| 5,606,540 | 2/1997 | Hayashi | 369/59 |
| 5,615,191 | 3/1997 | Takeda et al. | 369/58 |

FOREIGN PATENT DOCUMENTS 7201136  8/1995  Japan .

*Primary Examiner*—Tan Dinh
*Attorney, Agent, or Firm*—Limbach & Limbach L.L.P.; Seong-Kun Oh

[57] ABSTRACT

The present invention provides a reproduction clock phase correction circuit, which can detect and set a phase exceeding one clock (one pit), in which a resolution and a detection range are never changed even if a clock frequency is changed.

The reproduction clock phase correction circuit is provided with a voltage control oscillator in which delay element in a plurality of stages are connected in a form of a ring, a clock selecting means for selectively extracting an output clock of the delay element at any stage in the voltage control oscillator as a reproduction clock, a sampling means for sampling, on the basis of the reproduction clock, a reproduction signal of a reference clock reproduced from a record medium, and a selection controlling means for detecting phase information of the reproduction clock for the reference clock on the basis of a sampling value by mean of the sampling means to thereby control the clock selecting means on the basis of the phase information.

5 Claims, 10 Drawing Sheets

FIG.1

(PRIOR ART)

FIG.2

(PRIOR ART)

REPRODUCTION CLOCK PHASE CORRECTION CIRCUIT

BACKGROUND OF THE INVENTION

1. Field of the Invention

The present invention relates to a reproduction clock phase correction circuit in a driving apparatus of a record medium having a sample servo format.

2. Description of the Related Art

Generally, in a case of an optical disk system for scanning a concentrically or spirally formed track by means of a laser beam to thereby record/reproduce various data, a CLV method of rotating and driving an optical disk at a constant liner velocity, a CAV method of rotating and driving an optical disk to thereby record/reproduce data, an MCAV (Modified CAV) method of keeping a spatial record density substantially constant in inner and outer circumferences of a disk to thereby improve a record efficiency, and the like are well known. Further, a continuous servo method of using a pre-group arranged continuously along a track to thereby carry out a tracking control and the like, and a sample servo method of utilizing a servo area arranged discretely on a track to thereby carry out a tracking control are well known.

Further, a so-called ROM disk dedicated for reproduction, a recordable RAM disk such as a postscript type disk, a magneto-optic (MO) disk and the like, a so-called hybrid disk having a ROM area and a RAM area and the like are well known.

Generally, in a driving apparatus of a magneto-optic disk having a sample servo format in which a concentrically or spirally formed track which are respectively composed of a servo area and a data area is divided into a plurality of areas, an outer clock is generated with a clock reproducing pit located at the servo area as a base. Then, data is recorded/reproduced using the outer clock. In a case of the driving apparatus for using the outer clock to thereby record/reproduce the data, there may be a possibility that a phase error is induced between a phase of the reproduction data and a phase of the outer clock, because of a distance difference between pits at an outer circumference and at an inner circumference, a temperature performance and the like. Hence, the phase error of the outer clocker has been tried to be corrected by recording a reference clock of a maximum repetition frequency on a predetermined area of a header sector during data recording and then using a reproduction signal of the reference clock during reproduction.

Figure 1:
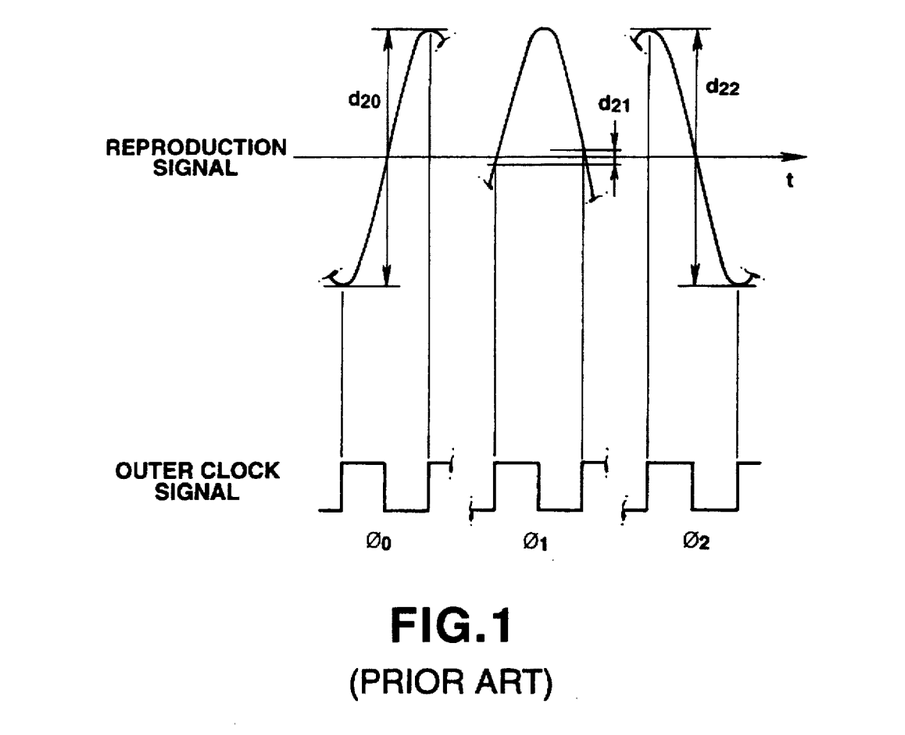
FIG. 1 is a view showing a relation between a reproduction signal of a reference clock and an outer clock in a conventional recording/reproducing apparatus.

That is, in a case of using the reference clock of the maximum repetition frequency, if sampling the reproduction signal of the reference clock at outer clocks $\phi 0, \phi 1, \phi 2 \ldots$ whose phases are different from each other as shown in FIG. 1, when a phase relation between the reference clock and the outer clock is optimum, an absolute value of a difference between the continuous sampling values becomes minimum. A difference value at a time of sampling at the outer clock $\phi 1$ is minimum in an example shown in FIG. 1. Thus, the phase of the outer clock can be compensated by sequentially sampling the reproduction signals of the reference clocks at a plurality of outer clocks $\phi 0, \phi 1, \phi 2 \ldots$ whose phases are different from each other, determining the difference values $d20, d21, d22 \ldots$ of the sampling values at the respective outer clocks $\phi 0, \phi 1, \phi 2 \ldots$, detecting a minimum value of the difference values and then using the outer clock of the phase at which the difference value becomes minimum to thereby reproduce the data.

Figure 2:
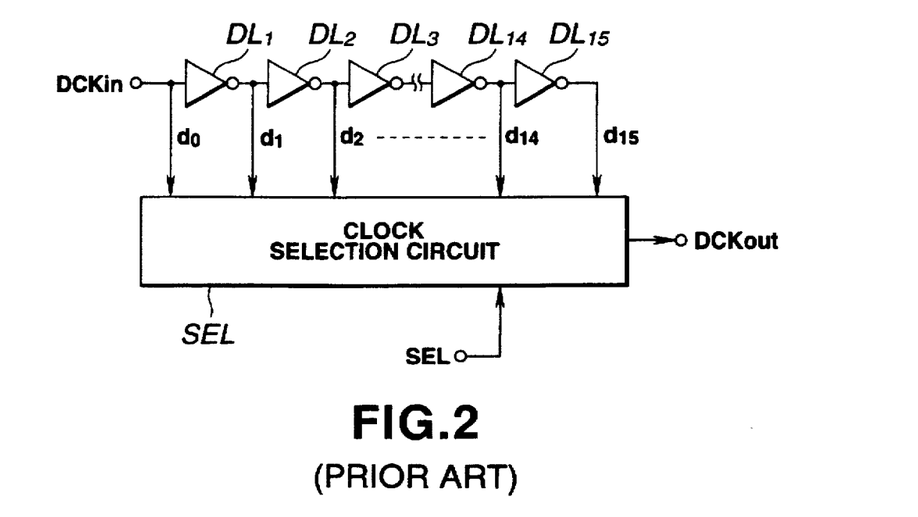
FIG. 2 is a block diagram showing a configuration of a conventional reproduction clock phase correction circuit.

Up to now, for example, as shown in FIG. 2, the respective outer clocks $\phi 0, \phi 1, \phi 2 \ldots$ are obtained by a reproduction clock phase correction circuit, which connects (n−1) delay elements DL1, DL2 . . . DLn to each other in series to selectively extract an output clock from the delay element at any stage on the basis of an input of a clock selection circuit SEL. This method is disclosed in Japanese Patent Application Laying Open (KOKAI) No.7-201136.

However, it is difficult for the conventional reproduction clock phase correction circuit to compensate for changes of performance, such as a delay amount or the like resulting from an environment factor such as the temperature of the delay element and the like. Thus, the clock phase can not be corrected with high accuracy. Further, considering variation of the performances of the respective delay elements, the temperature performance thereof and the like, it is impossible to set all the delay amounts throughout one period of the clock.

Therefore, the above mentioned conventional reproduction clock phase correction circuit can not be used, since it has a range in which the phase can not be set, when it is necessary to carry out a detection action in a range equal to or more than one period of the clock, for example, as in a case where a deviation of a pit position at a time of recording is equal to or more than one clock, namely, one pit.

Furthermore, in the conventional reproduction clock phase correction circuit for setting the delay amount, namely, the time, in a case where the clock frequency is changed in the MCAV method in which the disk rotates at constant angular velocities and record/reproduction frequencies, namely, the times for one clock (one pit) are different in inner and outer circumferences, the resolution (spatial resolution=phase resolution) and the detection range (spatial range=phase range) are changed. Or, conversely, if only the detection range is set the same, the number of the necessary processing steps is changed. As a result, a necessary area for the processes is changed.

OBJECT & SUMMARY OF THE INVENTION

It is therefore an object of the present invention to provide a reproduction clock phase correction circuit, which can detect and set a phase in a whole range within one clock (one pit), from the viewpoint of the problems in the conventional reproduction clock phase correction circuit as mentioned above.

Another object of the present invention is to provide a reproduction clock phase correction circuit, which can detect and set a phase exceeding one clock (one pit).

A further object of the present invention is to provide a reproduction clock phase correction circuit in which a resolution and a detection range are not changed even if a clock frequency is changed.

The reproduction clock phase correction circuit in accordance with the present invention is characterized in including a voltage control oscillator in which delay elements in a plurality of stages are connected, a clock selecting means for selectively extracting an output clock of the delay element at any stage in the voltage control oscillator as a reproduction clock, a sampling means for sampling through the reproduction clock, a reproduction signal of a reference clock reproduced from a record medium, and a selection controlling means for detecting phase information of the reproduction clock for the reference clock on the basis of a sampling value by means of the sampling means to thereby control the clock selecting means on the basis of the phase information.

The reproduction clock phase correction circuit according to the present invention is characterized in that it further comprises the step of detecting the phase information of the reproduction clock by using the reproduction signal of the reference clock having a period of nT+nT=2nT to a clock period T with n as a positive integer.

Further objects and advantages of the present invention will be apparent from the following description of the preferred embodiments of the invention as illustrated in the accompanying drawings.

DESCRIPTION OF THE PREFERRED EMBODIMENT

An embodiment of the present invention is explained hereinafter with reference to the drawings.

A reproduction clock phase correction circuit in accordance with the present invention generates a system clock in a driving apparatus of a magneto-optic disk in a sample servo format. For example, it is used in order to correct a phase of an outer clock by using a reference clock. Then, at first, a sample servo type of a magneto-optic disk is explained which records the reference clock.

Figure 3:
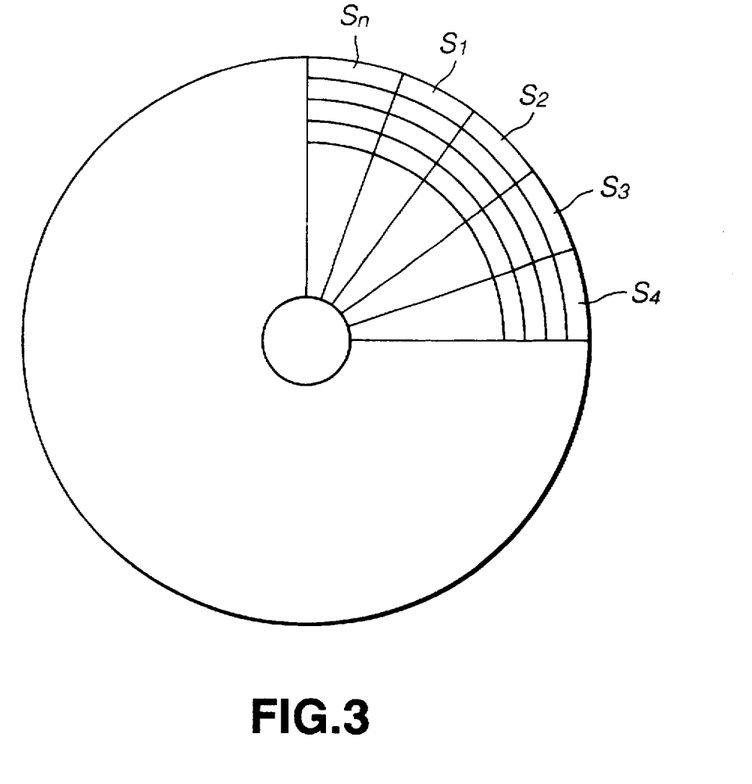
FIG. 3 is a view that schematically shows a magneto-optic disk of a sample servo format on which a reference clock is recorded.
Figure 4:
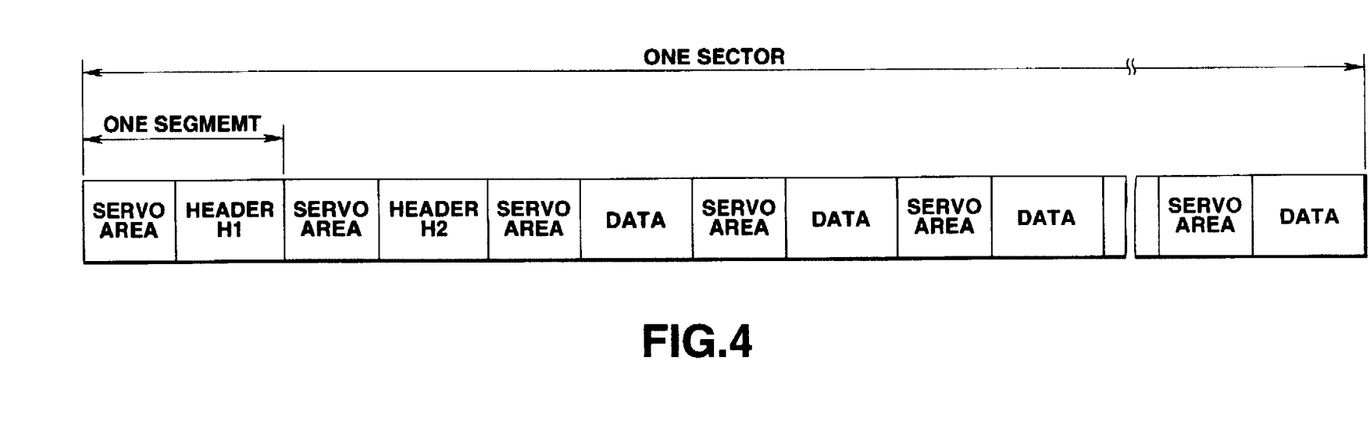
FIG. 4 is a view showing a configuration of one sector in the magneto-optic disk.

As shown in FIG. 3, in this type of the magneto-optic disk (a record medium such as a phase changing type disk and the like), a concentric or spiral track T is divided into a plurality of sectors S. Data is recorded/reproduced at each of the sectors S0, S1, S2 .... As shown in FIG. 4, each of sectors S0, S1, S2 ... are further divided into a plurality of segments. Each of the segments are composed of a servo area and a data area.

At least two servo pits, which are together placed ±¼ tracks from a center of the track, are mounted in the servo area. A clock reproduction, a tracking control and the like are carried out on the basis of a reproduction signal from the servo pit.

As shown in FIG. 4, a top segment at each of the sectors is a header H1 on which an address, a sector mark and the like are recorded as control information for each of the sectors. A next segment is a header H2 on which the reference clock is recorded at a time of recording data.

Figure 5:
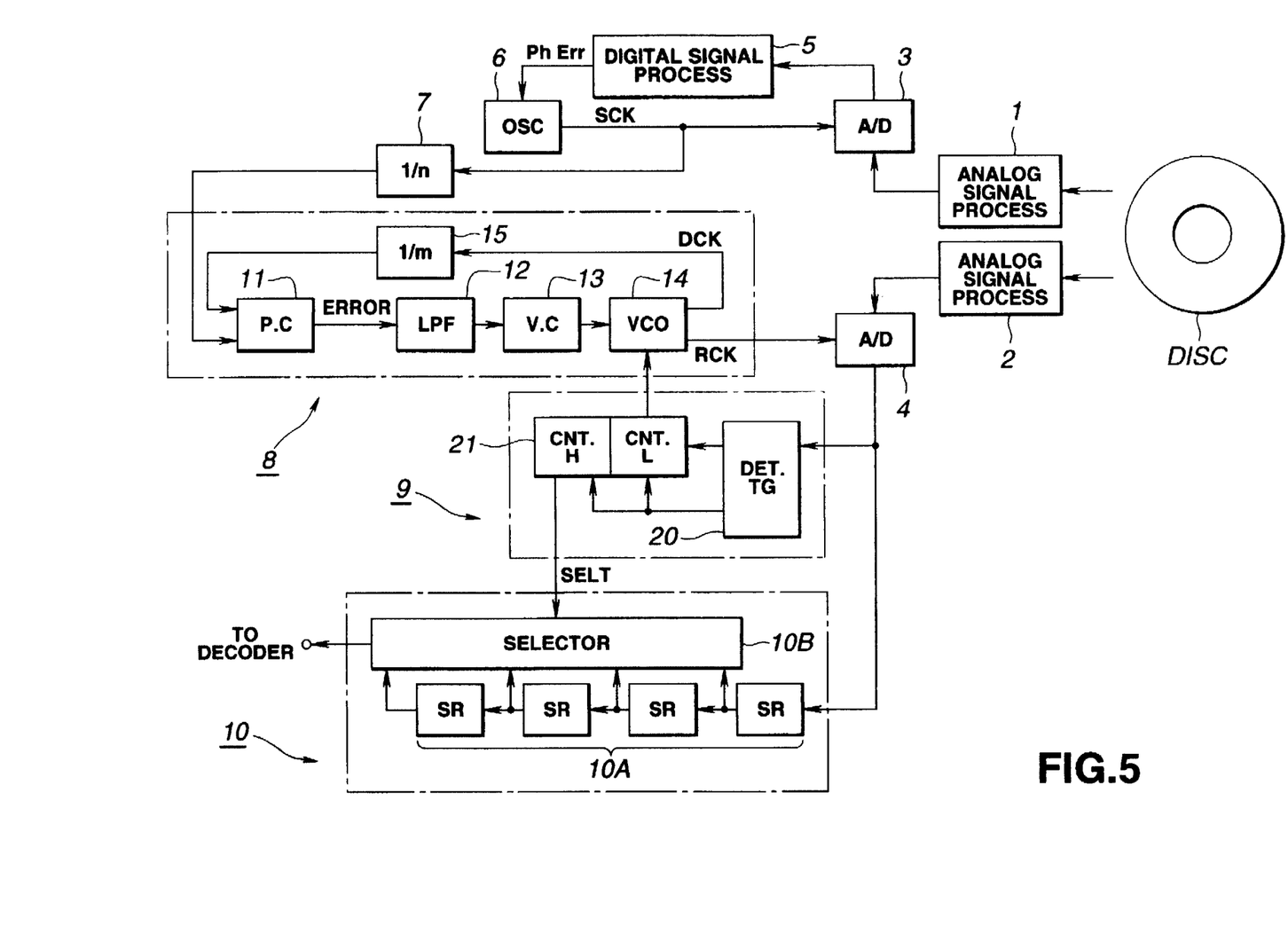
FIG. 5 is a block diagram showing a configuration of a reproduction clock phase correction circuit for generating a system clock in a driving apparatus of the magneto-optic disk.

The reproduction clock phase correction circuit in accordance with the present invention is constituted as shown in FIG. 5, for example.

This reproduction clock phase correction circuit generates the system clock in the driving apparatus of the record medium, and is provided with: first and second A/D converters 3, 4 to which the reproduction signals from the record medium are analog-processed and sent by analog process circuits 1, 2; a digital signal processing section 5 to which an output of the first A/D converter 3 is sent; an oscillator 6 for sending a servo clock SCK to the first A/D converter 3; a data clock generating section 8 to which the servo clock SCK is sent through a 1/n frequency demultiplier 7; a selection controlling section 9 to which an output of the second A/D converter 4 is sent; and a delay processing section 10.

The first A/D converter 3 samples a signal level of the reproduction signal in the servo area based on the servo clock SCK sent by the oscillator 6, and sends the sampling value to the digital signal processing section 5. The digital signal processing section 5 generates a phase error information PhErr from the sampling value by means of the first A/D converter 3, and sends this phase error information PhErr to the oscillator 6. The first A/D converter 3, the digital signal processing section 5 and the oscillator 6 constitute a phase locked loop PLL which generates the servo clock SCK in synchronization with a rotation of a disk.

The data clock generating section 8 is provided with: a phase comparator 11 to which the servo clock SCK is sent through the 1/n frequency divider; a voltage controlling section 13 to which a phase error signal Error obtained by the phase comparator 11 is sent through a loop filter 12, a voltage control oscillator 14 in which an oscillation phase is controlled by the voltage controlling section 13 and a 1/m frequency demultiplier 15 for 1/m frequency-demultiplying an oscillation output by means of the voltage control oscillator 14 to thereby send to the phase comparator 11. The phase comparator 11, the loop filter 12, the voltage controlling section 13 and the voltage control oscillator 14 constitute the PLL for generating a data clock DCK having a frequency $f_{DCK}$ where $f_{DCK}=m\,f_{SCK}/n$ for a frequency $f_{SCK}$ of the servo clock SCK, by means of the voltage control oscillator 14.

This data clock generating section 8 can switch the frequency $f_{DCK}=m\,f_{SCK}/n$ of the data clock DCK for each area in the MCAV method based on the settings of frequency-demultiplying ratios 1/n and 1/m of the 1/n frequency demultiplier 7 and the 1/m frequency multiplier 15 respectively.

Figure 6:
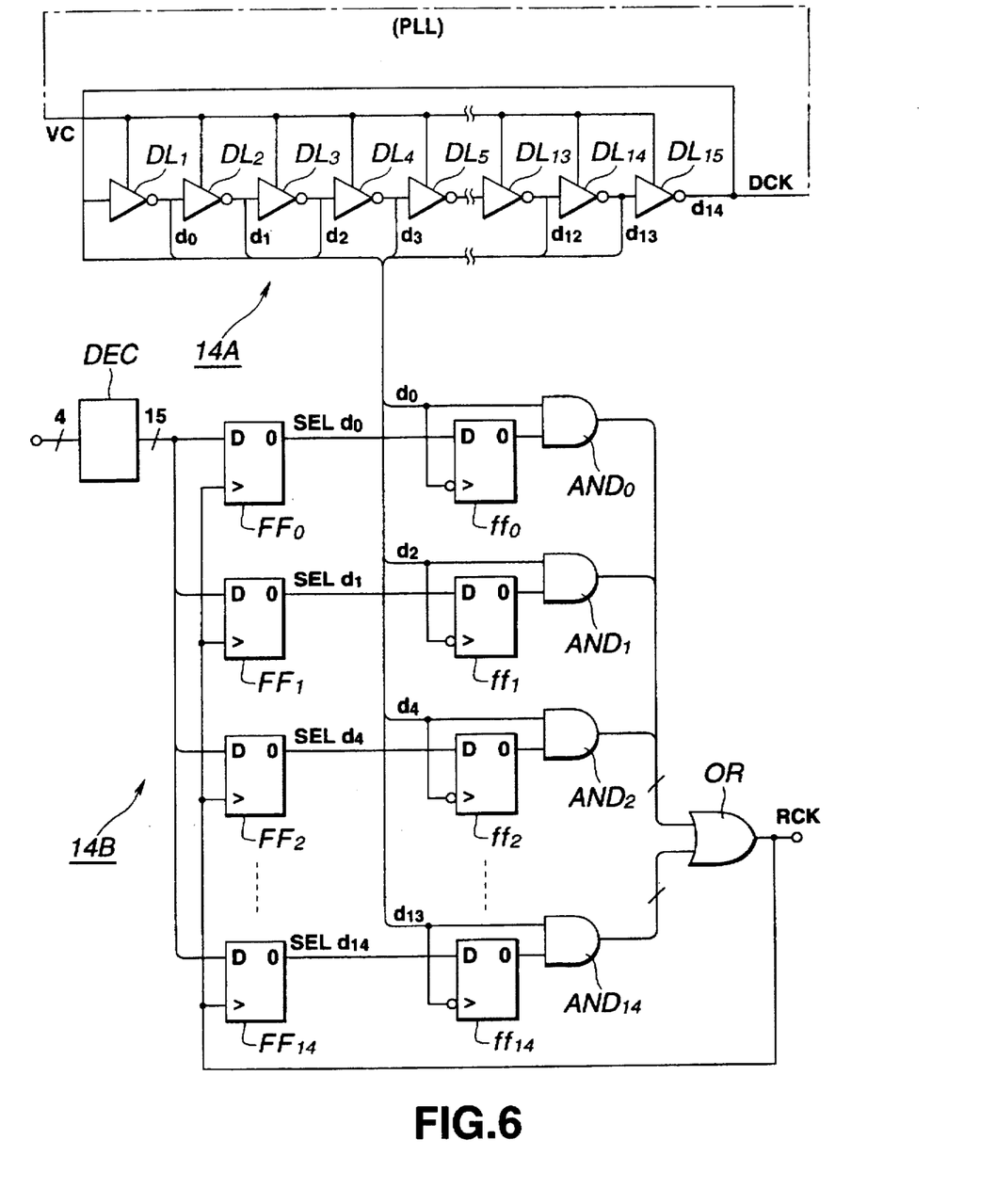
FIG. 6 is a block diagram showing a configuration of a voltage control oscillator in a data clock generating section constituting the reproduction clock phase correction circuit.

The voltage control oscillator 14 in the data clock generating section 8 is provided with an oscillating section 14A and a clock selecting section 14B, as shown in FIG. 6. The oscillating section 14A is arranged such that fifteen delay elements DL1, DL2 .... DL15, which respectively use inverters, are connected to each other in a form of rings, and constitutes a ring oscillator for oscillating fifteen phase clocks d0, d1, d2 ... d14. In the oscillating section 14A, a delayed amount at each of the stages is controlled since each of inverter power supply voltages used as the delay elements DL1, DL2 ... DL15 are controlled by the voltage controlling section 13. Accordingly, the oscillation phase is controlled.

The clock selecting section 14B selects the fifteen phase clocks d0, d1, d2 ... d14 obtained by the oscillating section 14A on the basis of a selection data SEL of four pits sent by the selection controlling section 9 to thereby send to the second A/D converter 4 as a reproduction data clock RCK. The clock selecting section 14B is provided with; a decoder DEC for decoding the selection data SEL of the four pits into fifteen pit data; respective D flip flops FF0, FF1, FF2 . . . FF14 for latching the decoded output by the decoder DEC at a timing of a leading edge of the reproduction data clock RCK; respective D flip flops ff0, ff1, ff2 . . . ff14 for latching the respectively latched outputs from the respective D flip flops FF0, FF1, FF2 . . . FF14 at timings of trailing edges of the clocks d0, d2, d4 . . . d12, d14, and d1, d3, d5 . . . d11, d13 in the respective phases; respective logical product calculation circuits AND0, AND1, AND2 . . . AND14 for calculating logical products of the respectively latched outputs from the respective D flip flops ff0, ff1, ff2 . . . ff14 and the clocks d0, d2, d4 . . . d12, d14, and d1, d3, d5 . . . d11, d13 in the respective phases; and a logical sum calculation circuit OR for calculating a logical sum of respective outputs from the respective logical product calculation circuits AND0, AND1, AND2 . . . AND14. The data clock generating section 8 sends the logical sum output by the logical sum calculation circuit OR to the second A/D converter 4 as the reproduction data clock RCK.

Figure 7:
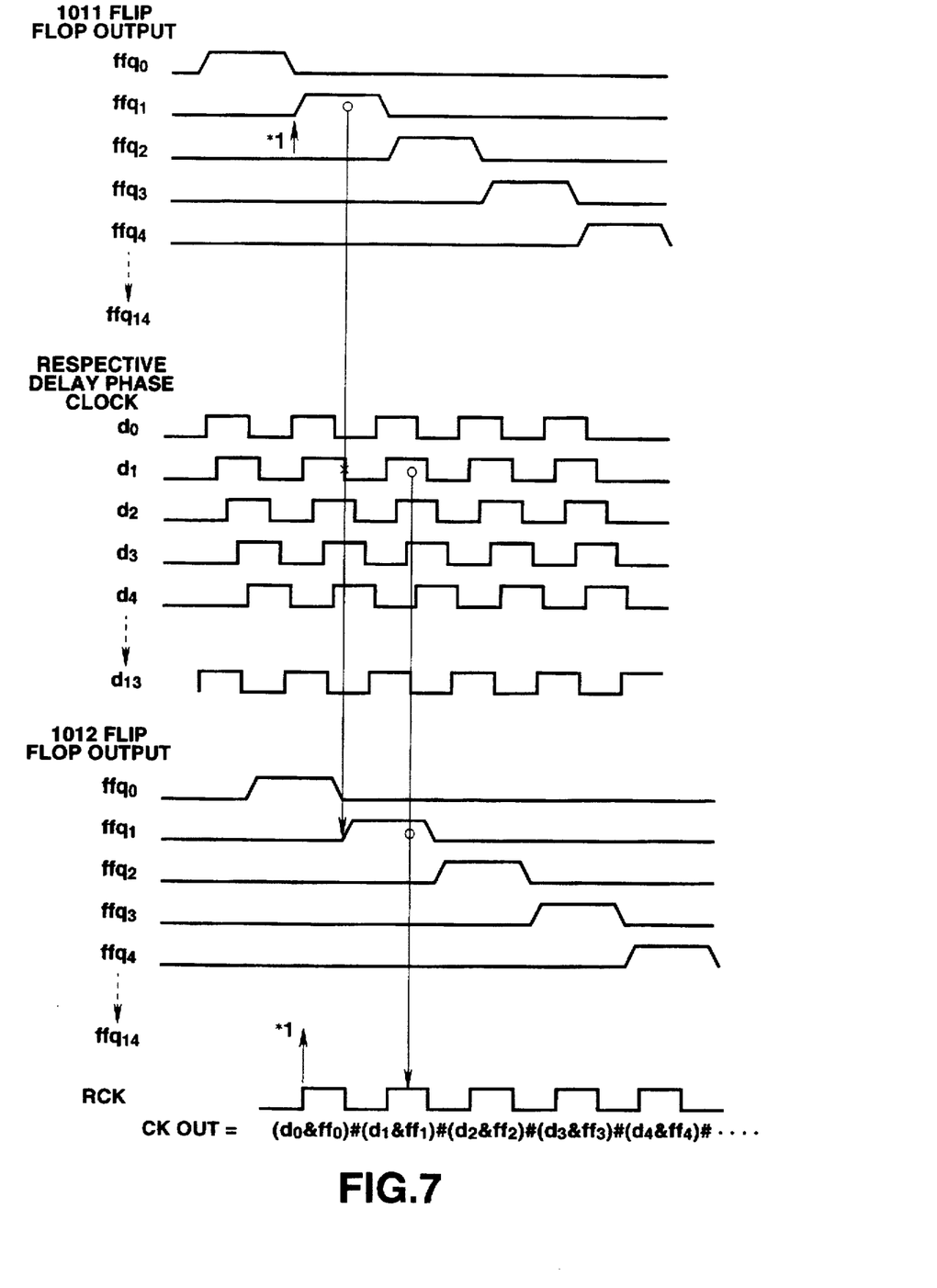
FIG. 7 is a timing chart showing an operation of the data clock generating section.

With the above mentioned configuration, as shown in a timing chart of FIG. 7, the data (generating section 8 can obtain the reproduction data clock RCK having a desired timing and phase which even correctly corresponds to even a case of continuously crossing clock periods (d13→d0), with no glitch in the selected clock and with no lacked case.

Referring back to FIG. 5, the second A/D converter 4 samples the signal level of the reproduction signal through the reproduction data clock RCK sent by the data clock generating section 8, and sends the sampling value to the selection controlling section 9 and the delay processing section 10.

The selection controlling section 9 is provided with a digital signal processing section 20 to which the sampling value of the signal level of the reproduction signal is sent from the second A/D converter 4 and a phase setting counter 21 controlled by the digital signal processing section 20.

Figure 8:
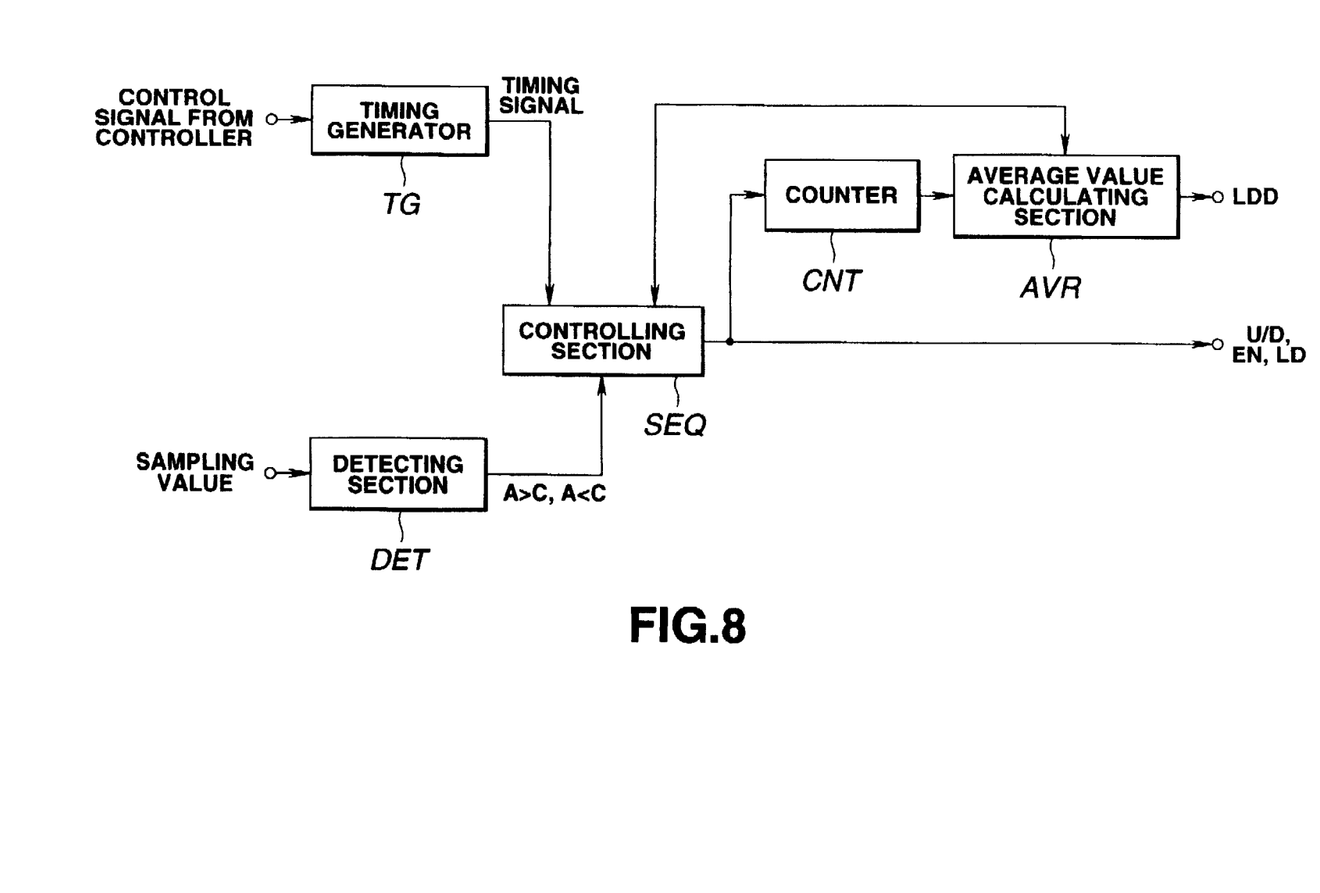
FIG. 8 is a block diagram showing a configuration of a selection controlling section constituting the reproduction clock phase correction circuit.

As shown in FIG. 8, the digital signal processing section 20 is provided with a detecting section DET to which the sampling value of the signal level of the reproduction signal is sent by the second A/D converter 4, a timing generator TG to which a control signal is sent by a controller, a controlling section SEQ to which outputs of the detecting section DET and the timing generator TG are sent, a counter CNT controlled by the controlling section SEQ and an average value calculating section AVR.

Figure 9:
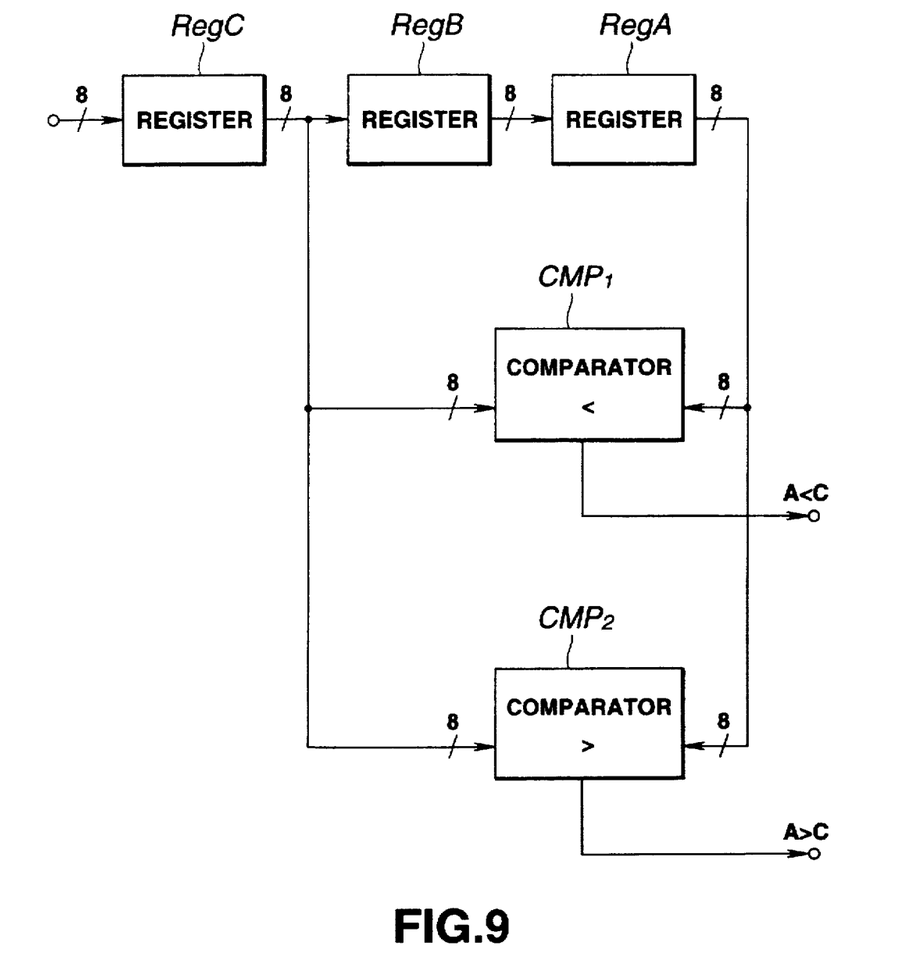
FIG. 9 is a block diagram showing a configuration of a detecting section in the selection controlling section.

As shown in FIG. 9, the detecting section DET is provided with three registers RegA, RegB and RegC connected to each other in series, and two comparator, CMP1, CMP2 for comparing an output value A of the register RegA at a first stage thereof with an output value C of the register RegC at a final stage. In the detecting section DET, the three registers RegA, RegB and RegC sequentially send the sampling values sent, in turn from the second A/D converter 4 to a register at a later stage to thereby maintain the three continuous sampling values. The two comparators CMP1, CMP2 compare the output value A of the register RegA at the first stage with the output value C of the register RegC at the final stage. One comparator CMP1 sends to the controlling section SEQ a comparison output indicating a state of A<C, for example, by means of a logic [1]. The other comparator CMP2 sends to the controlling section SEQ a comparison output indicating a state of A>C, for example, by means of a logical [1].

The timing generator TG sends to the controlling section SEQ a timing signal of managing a timing within the reference area on the basis of the control signal sent by the controller.

The controlling section SEQ controls so as to make the counter CNT and the average value calculating section AVR calculate a phase average, on the basis of the timing signal within the reference area from the timing generator TG and the phase comparison information of A<C and A>C from the detecting section DET, and further controls so as to convert the phase average data into a modulo 1 at a time point of an end of the reference area to thereby load as a phase set data DDL to the phase setting counter 21 of FIG. 5.

In the reference area, a loop is constituted of the voltage control oscillator 14, the second A/D converter 4, the digital signal processing section 20 and the phase setting counter 21. A phase optimum for the data reproduction is detected. Then, it is introduced to the optimum phase. When the data area appears after the end of the reference area, the data reproduction can be carried out in a condition that the detected phase is kept.

Figure 10:
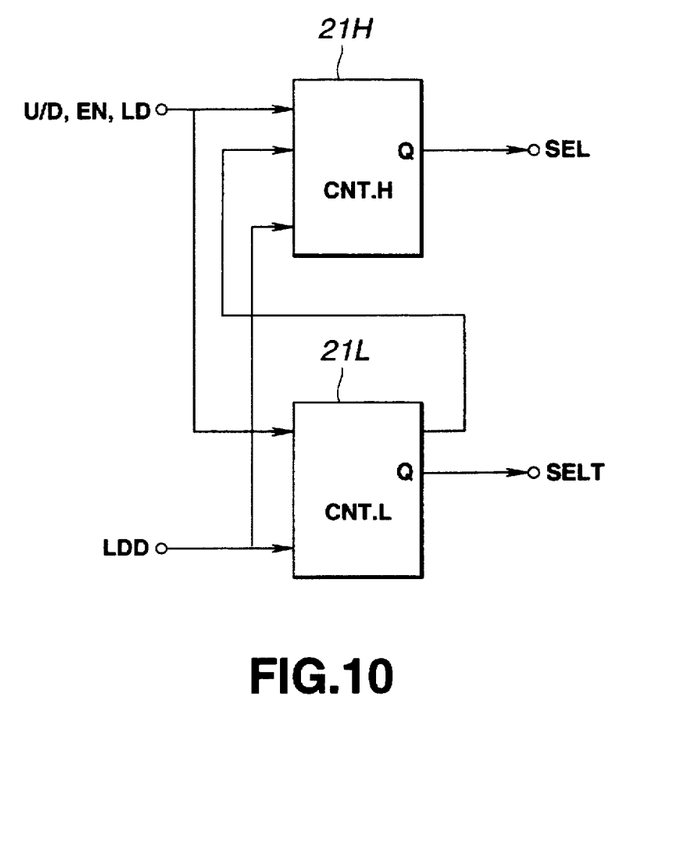
FIG. 10 is a block diagram showing a configuration of a counter for setting a phase in the selection controlling section.

As shown in FIG. 10, the phase setting counter 21 is an up down counter composed of a low order counter 21L and a high order counter 21H, and is controlled by control signals EN, U/D and LD from the controlling section CNT. That is, the counter 21 specifies a count-up or a count-down based on the control signal U/D, and carries out a counting action based on the control signal EN. When the control signal LD from the controlling section SEQ is sent at the end of the reference area, the phase average data obtained by the average value calculating section AVR is converted into the modulo 1 and loaded as a phase setting data LDD. An output of the low order counter 21L is sent, as the selection data SEL of the four pits, to the clock selecting section 14B of the voltage control oscillator 14 in the data clock generating section 8. An output of the high order counter 21H is sent, as a selection data SEL for correcting the timing of the reproduction data, to the delay processing section 10.

The delay processing section 10 is composed of a shift register section 10A having N stages and a selector section 10B for selecting delay outputs at the respective stages, and is constructed such that the selector section 10B is controlled by the selection data SEL from the high order counter 21H. Accordingly, in the data area, the reproduction data corrected at a proper timing is outputted through the delay processing section 10.

For example, in a case of having to detect in a range equal to or more than three clocks, the high order counter 21H has values zero [0] to [3]. And, in a case where an optimum timing is late, that is, for example, when the value of the high order counter 21H is three [3], the output at the first stage of the shift register section 10A having four stages is used in the data reproduction. Then, in a case where the optimum timing is early, that is, for example, when the value of the high order counter 21H is [0], the output at the final stage of the shift register section 10A having the four stages is used in the data reproduction. As a result, it is possible to absorb deviation of the timing.

Figure 11:
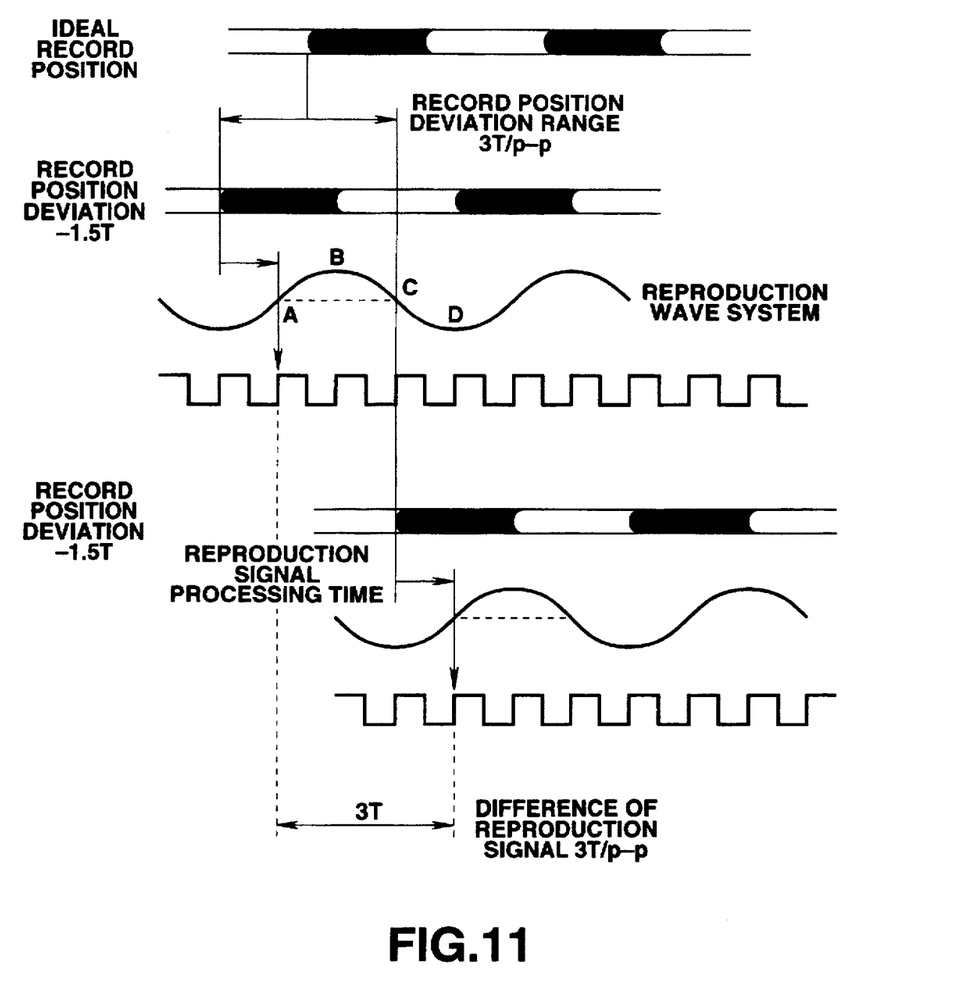
FIG. 11 is a view showing an ideal record position and a distorted record position in white and black pit patterns.

FIG. 11 shows an ideal record position and a record position at which a maximum deviation amount is approximately three clocks, in white and black patterns (2T+2T). In order to optimally extract the reproduction signal of this pit, it is necessary to detect and correct the reproduction clock in the range equal to or more than the three clocks. Now, the reference clock at which the phase detection is carried out is assumed to be a pattern having a period of 2T+2T=4T. In a case of this pattern, it is possible to ideally detect the phase in a range less than four clocks.

The phase detection is carried out on the basis of the phase comparison information of A<C and A>C from the detecting section DET. In a case of carrying out a phase set such that a difference of a–c between reproduction waves is zero 0, a phase deviation thereof is three clocks (3T).

Referring back to FIG. 5, in the data clock generating section 8 for selecting the fifteen phase clocks d0, d1, d2 . . . . d14 obtained by the oscillating section 14A on the basis of the selection data SEL of the four pits sent by the selection controlling section 9 to thereby set to the reproduction data clock RCK, the low order portion represents the phase, and the high order portion represents the timing. Then, the phase set data is increased at the order of [Timing, Phase]=[0, d0]→[0, d1]→[0, d2]→. Thus, since the phase d16=d0, then: →[0, d15]→[1, d1]→. Therefore, when the phase proceeds by one period, this means the proceeding of one clock. As a result, a phase detection range equal to approximate 4T can by obtained by continuously increasing and decreasing the phase set data from [0, d0] to [3, dn].

In a case that the reference clock is the pattern having the period of 2T+2T=4T, since at a certain phase an erroneous detecting and introducing action is carried out at a phase located 4T therefrom, it is impossible to obtain the phase detection range equal to or more than 4T. However, it is possible to reserve the phase detection range approximately equal to 8T, for example, by using a reference clock of a pattern having a period of 4T+4T=8T. That is, it is enough to change the pattern period of the reference clock on the basis of a necessary detecting and introducing range.

Many widely different embodiments of the present invention may be constructed without departing from the spirit and scope of the present invention. It should be understood that the present invention is not limited to the specific embodiments described in the specification, except as defined in the appended claims.

What is claimed is:

1. A reproduction clock phase correction circuit, comprising:

a voltage control oscillator in which delay elements in a plurality of stages are connected;

clock selecting means for selectively extracting an output clock of the delay element at any stage in said voltage control oscillator as a reproduction clock;

sampling means for sampling a reproduction signal of a reference clock reproduced from a record medium on the basis of said reproduction clock; and selection controlling means for detecting phase information of the reproduction clock for the reference clock on the basis of a sampling value by means of said sampling means to thereby control said clock selecting means on the basis of the phase information.

2. A reproduction clock phase correction circuit, comprising:

a voltage control oscillator in which delay elements in a plurality of stages are connected;

clock selecting means for selectively extracting an output clock of the delay element at any stage in said voltage control oscillator as a reproduction clock;

sampling means for sampling a reproduction signal of a reference clock reproduced from a record medium on the basis of said reproduction clock;

selection controlling means for detecting phase information of the reproduction clock for the reference clock on the basis of a sampling value by means of said sampling means to thereby control said clock selecting means on the basis of the phase information; and a detector for detecting the phase information of the reproduction clock by using the reproduction signal of the reference clock having a period of nT+nT=2nT for a clock period T with n as a positive integer.

3. A method of providing phase correction in a reproduction clock phase correction circuit, said method comprising the steps of:

coupling delay elements in a plurality of stages in a voltage control oscillator;

selectively extracting an output clock of the delay element at any stage in said voltage control oscillator as a reproduction clock;

sampling a reproduction signal of a reference clock reproduced from a record medium on the basis of said reproduction clock to provide a sampling value; and detecting phase information of the reproduction clock for the reference clock on the basis of said sampling value to control said step of selectively extracting said output clock on the basis of the phase information.

4. The method of claim 3 further comprising the step of detecting the phase information of the reproduction clock using the reproduction signal of the reference clock having a period of nT+nT=2nT for a clock period T with n as a positive integer.

5. A method of providing phase correction in a reproduction clock phase correction circuit, said method comprising the steps of:

coupling delay elements in a plurality of stages in a voltage control oscillator;

selectively extracting an output clock of the delay element at any stage in said voltage control oscillator as a reproduction clock;

sampling a reproduction signal of a reference clock reproduced from a record medium on the basis of said reproduction clock to provide a sampling value wherein said reproduction signal of said reference clock has a period of nT+nT=2nT for a clock period T with n as a positive integer; and detecting phase information of the reproduction clock for the reference clock on the basis of said sampling value to control said step of selectively extracting said output clock on the basis of the phase information.

* * * * *